(12) United States Patent
Carlberg et al.

(10) Patent No.: US 6,447,681 B1
(45) Date of Patent: Sep. 10, 2002

(54) AQUACULTURE WASTEWATER TREATMENT SYSTEM AND METHOD OF MAKING SAME

(75) Inventors: James M. Carlberg, El Cajon; Jon C. Van Olst, Oak View; Michael J. Massingill, San Diego; Rodney J. Chamberlain, Indio, all of CA (US)

(73) Assignee: Kent Sea Tech Corporation, San Diego, CA (US)

( * ) Notice: Subject to any disclaimer, the term of this patent is extended or adjusted under 35 U.S.C. 154(b) by 0 days.

(21) Appl. No.: 09/633,862

(22) Filed: Aug. 7, 2000

(51) Int. Cl.[7] .................. A01K 63/04; C02F 3/02; C02F 3/32
(52) U.S. Cl. .............. 210/602; 210/617; 210/629; 210/747; 210/150; 210/169; 210/170; 210/219; 210/903; 210/908; 210/926; 119/227
(58) Field of Search .................. 210/602, 615–617, 210/620–622, 629, 747, 150, 151, 169, 170, 195.1, 196, 201–202, 259, 220, 903, 908, 926, 219; 119/226, 227

(56) References Cited

U.S. PATENT DOCUMENTS

| | | | |
|---|---|---|---|
| 1,643,273 A | * | 9/1927 | Imhoff |
| 3,462,360 A | * | 8/1969 | McKinney |
| 4,043,299 A | | 8/1977 | Birkbeck et al. |
| 4,052,960 A | | 10/1977 | Birkbeck et al. |
| 4,093,546 A | * | 6/1978 | Taborsky |
| 4,211,183 A | | 7/1980 | Hoult |
| 4,251,359 A | | 2/1981 | Colwell et al. |
| 4,532,038 A | * | 7/1985 | Reid |
| 4,995,980 A | * | 2/1991 | Jaubert |
| 5,061,368 A | | 10/1991 | Tada et al. |
| 5,121,708 A | * | 6/1992 | Nuttle |
| 5,176,100 A | * | 1/1993 | Fujino |
| 5,227,055 A | | 7/1993 | Timmons |
| 5,353,745 A | * | 10/1994 | Fahs, II |
| 5,458,779 A | | 10/1995 | Odegaard |
| 5,466,373 A | * | 11/1995 | Handwerker et al. |
| 5,543,039 A | | 8/1996 | Odegaard |
| 5,558,763 A | | 9/1996 | Funakoshi et al. |
| 5,582,734 A | | 12/1996 | Coleman et al. |

(List continued on next page.)

Primary Examiner—David A. Simmons
Assistant Examiner—Fred Prince
(74) Attorney, Agent, or Firm—Richard D. Clarke

(57) ABSTRACT

An aquaculture wastewater treatment system is provided including three wastewater treatment subsystems. The first subsystem is comprised of a fish raceway solids removal channel populated with relatively high densities of a detritivorous fish such as tilapia and/or carp, that have high potential as an efficient means of feeding on, and thereby, removing suspended solids and particulate matter that are present in the primary fish production effluent. The second wastewater treatment subsystem is comprised of an enhanced form of nitrifying reactor termed the Suspended Media Ammonia Removal Technology (SMART) biofilter reactor subsystem. This water treatment component consists of an open ditch bioreactor oxidation vessel in which water is circulated by means of one or more powered paddle-wheels. The water within the SMART subsystem bioreactor vessel contains numerous polyurethane foam particles cut into cubes, spheres or other shapes, and/or plastic extruded pipe cut into various lengths, that provide an increased well-aerated surface area for the support and growth of microorganisms, including nitrifying bacteria. The third wastewater treatment subsystem in the sequential water treatment system includes a series of constructed wetlands ponds. Pre-treated effluent from the SMART subsystem is delivered to numerous large, shallow earthen ponds that are planted with mature climate tolerant bulrush plants (Scirpus sp.). The subsystems are efficient, economical, and readily scalable and adaptable to any wastewater treatment application.

23 Claims, 5 Drawing Sheets

U.S. PATENT DOCUMENTS

| | | |
|---|---|---|
| 5,593,574 A | 1/1997 | VanToever |
| 5,618,413 A * | 4/1997 | Todd et al. |
| 5,632,887 A * | 5/1997 | Gargas et al. |
| 5,660,142 A | 8/1997 | Van Rijn |
| 5,733,456 A | 3/1998 | Okey et al. |
| 5,772,887 A | 6/1998 | Noah et al. |
| 5,820,759 A | 10/1998 | Stewart et al. |
| 5,863,433 A | 1/1999 | Behrends |
| 6,041,738 A * | 3/2000 | Hemauer et al. |
| 6,065,430 A * | 5/2000 | Sheriff |
| 6,159,371 A * | 12/2000 | Dufay |

\* cited by examiner

AQUACULTURE WASTEWATER TREATMENT SYSTEM AND METHOD OF MAKING SAME

BACKGROUND OF THE INVENTION

1. Field of the Invention

The present invention relates to a wastewater treatment system and method of using same. More particularly, the present invention relates to a new and improved wastewater treatment system having a unique combination of three subsystems for employing biological, microbiological, and mechanical means to remove water contaminants in an aquaculture operation application, and other applications.

2. Description of the Related Art

As health conscious Americans begin to consume more fish products and the naturally occurring sources of fish become depleted, there is a growing need to fill the demand for fish products by turning to aquaculture. Aquaculture is defined as the production and husbandry of aquatic plants and animals in controlled environments. The term husbandry means the application of scientific principles to farming. Controlled environments are directed or regulated production environments ranging from a low level of control, termed "extensive," where limited capital and management are applied, to a high level of control, termed "intensive," where more comprehensive capital and management are applied to production.

Aquaculture has become a one billion dollar industry in the U. S. Nearly 15% of our seafood supplies are currently supplied by aquaculture. Growing at a rate of 20% per year, aquaculture is the fastest growing sector of the agriculture industry. Aquaculture is an ecologically efficient means of providing seafood for American consumers while significantly reducing pressure on our limited wild fisheries resources.

Foreign competition is having a major impact on U.S. aquaculture operations. More than 60% of our seafood supplies are now imported, resulting in a large annual trade deficit ($6.9 billion). A growing fraction of aquaculture imports comes from the warm climates of South America and Asia. These countries have the advantage of lower production costs by using abundant quantities of warm water that are available in the tropics. Often there are few or no environmental laws controlling their discharges which result in environmental degradation and little or no overhead costs associated with complying with environmental laws. Imports of fish grown in Colombia, Costa Rica, Ecuador, Taiwan, China, and Indonesia have increased markedly as the foreign competition adopts new culture technologies, often developed here in the U.S. These competing products are produced with low energy, water, labor, and environmental costs. As a result, many U.S. aquaculture products are not competitive with foreign aquaculture products.

Efficient, economical and productive aquaculture in the United States would meet the growing demands of fish in the American diet, would remove a huge burden on our natural wildlife resources and would also reduce our dependence on imports.

However, the industry of aquaculture is threatened by the environmental pollutants sometimes associated with the discharge of untreated fish farm effluents. The future existence and potential for expansion of the industry is in jeopardy unless methods can be developed to reduce the nutrients in the effluents emanating from fish farms that cause eutrophication in the receiving waters. Cage culture systems and pen culture farms are also hampered by nutrient contamination of ground water aquifers, drinking water reservoirs, and sensitive coastal estuaries. Catfish production in Mississippi is threatened by ground water overdraft, saltwater intrusion, and concerns about potential land subsidence.

Treatment of aquaculture wastewater to meet U.S. Environmental Protection Agency (EPA) effluent discharge regulations requires removal of settleable solids. Often treatment of dissolved nutrients is mandated as well. Many states are developing more rigid standards for biological oxygen demand (BOD), ammonia, total nitrogen, settleable solids, suspended solids, and phosphorus in an effort to prevent eutrophication and further degradation of natural resources. The EPA recently published a notice of proposed rule making in the Federal Register indicating that they will adopt guidelines and standards for effluents from concentrated aquatic animal production facilities by July 2004.

In order to address these issues, a broad spectrum of water treatment equipment has been marketed for years to treat virtually all of the pollutants created by fish and other farmed aquatic animals. However, the equipment currently available is based primarily on technologies developed for municipal sewage treatment that have been designed for heavily concentrated waste streams. Typically, the designs require large capital and operating budgets which can only be borne by governmental agencies and municipalities.

In addition, aquaculture facilities require a much higher degree of water quality for recycling than required by most treated municipal wastewater. Most of the existing technologies are generally not up to the task of producing high quality treated water suitable for aquaculture. In fact, the treated final discharge from a municipal sewage facility is often of poorer water quality than a totally untreated discharge from an aquaculture facility.

In general, intensive water treatment techniques have primarily been applied to closed-system aquaculture production processes. Closed system aquaculture utilizes purified recirculated water in the system. There have been several attempts over the past decade to develop closed system aquaculture operations in the U.S. Intensive, completely recirculated closed systems have been developed for tilapia, sturgeon, striped bass and catfish production.

The high cost of production associated with the expensive water treatment systems create a situation in which the price of the fish produced are not competitive on an open market when compared to fishery products and imports. In order to accommodate the high overhead expenses, many of these operations have resorted to selling product to a limited live fish retail market. These high production costs as well as numerous disease problems and off-flavor problems caused by poor water quality associated with closed systems have demonstrated that this method of production is impractical and unprofitable, at this time.

The use of traditional water treatment technologies has not been successful in commercial production to date and there have been many notable failures by companies attempting to use these methods. Each of the facilities cost millions of dollars to build. The types of treatment technologies that each of these companies utilized relied heavily on industrial design waste treatment components. These methods of waste treatment are expensive to purchase and operate and the resulting poor water quality often leads to disease and off-flavor problems. Even if the machinery functioned as was hoped, the operating costs were too high for what is essentially a farming venture to afford over the long term.

Unfortunately for the aquaculture industry, few manufacturers of biofiltration equipment have been able to develop truly low-cost technologies to meet the needs of this industry. Most existing biofiltration systems have been developed for the municipal sewage and manufacturing waste industries, fields in which significant public tax revenue or private profit margins have been available. The result has been the development of high-tech treatment components constructed of stainless steel or concrete and marketed by engineering companies focused tightly on high profit margin industries such as refineries and haz-mat cleanup. Almost all currently available water treatment equipment is too expensive to purchase and operate, to be useful and economical in the aquaculture industry.

In intensive, closed system aquaculture, the costs for water treatment often exceed $0.0566 per cubic meter ($70 per acre-foot). This is a relatively high cost that may be justifiable for holding broodstock in hatchery operations or for the production of high priced tropical fish held at low densities. However, water pumping or delivery costs for most agricultural commodities are on the order of $0.008–0.012 per cubic meter ($10–15 per acre-foot). Just as is the case with conventional agriculture, large-scale fish production operations require water at or below this cost range in order to remain competitive with the price structure for fish from the domestic commercial fisheries and from imports.

There have been a few efforts to develop intensive tank culture systems that use extensive open ponds for water treatment. However, these recirculated water treatment systems are generally converted fish production ponds which were not designed or managed to maximize water treatment. Two examples are a raceway tank culture system for channel catfish, and a similar system used on a seasonal basis for growing tilapia.

In addition to the problem of waste water treatment for eventual release as well as for use in recirculating closed systems, the future growth of the aquaculture industry in the U.S. is limited by the finite supply of water. Increased demands on surface and ground water resources are reducing the amount of water that can be reasonably used by aquaculture operations. Such pressures make some form of water reuse a prerequisite for long-term survival and expansion of the aquaculture industry.

Every major review of aquaculture has described the critical need for improved aquaculture water treatment systems if this new industry is to continue to expand in the U.S. The National Aquaculture Act and the revised National Aquaculture Plan highlight the importance of this area of aquaculture research and development. The 1994 National Agenda for Aquaculture and the Environment describes the critical need to conserve water and utilize wastes in integrated systems which combine terrestrial agriculture and constructed wetlands. The Congressional Joint Subcommittee on Aquaculture and the National Research Councils promote a "national agenda to encourage the development of advanced aquaculture technologies and environmentally sound, renewable resources," as part of the Presidential Initiative on Sustainable Development.

Obviously, aquaculture is a water dependent industry. Open systems (in which new water flows through the tanks once and is then discharged as waste) are much less complex and expensive than recirculated systems. Unfortunately, there are only a few sites in the U.S. with sufficient water supplies to support this method of production. In addition, there remains the need to address the issue of solid waste removal from effluents.

At the other extreme, totally closed systems require intensive filtration, which often involves very high capital and operating costs as well as associated poor water quality resulting in high mortality due to disease and off-flavors which affect the marketability of the product.

For these reasons, semi-open systems (in which most but not all of the water is recirculated) hold the key to future expansion of aquaculture in the U.S. The present invention relates to a new and improved semi-open aquaculture system and method of using it. This method of semi-open aquaculture allows fish to be held at high densities in intensive raceways or tanks, while a large fraction of the culture water is recycled through a series of extensive ponds for water treatment. There are several advantages to this approach, including lower costs for utilities, chemical use, and water treatment, and less labor needed for fish transfers and harvests. The cost advantages in treating the recycled water in pond systems rather than in more expensive filtration systems include reduced costs of installation, operation, and maintenance.

The semi-open system approach has very high potential, but there are several aspects which need to be addressed. A successful semi-open system would require a combination of intensive fish holding methods in combination with extensive water treatment methods. While the technology for intensive fish culture has advanced considerably over the past ten years, relatively little work has been directed toward the development of cost-effective extensive water treatment techniques for use in aquaculture. The present invention relates to a new and improved cost effective extensive water treatment system and method of using it.

The problem of finding secondary usage for the portion of the pond-treated water not utilized by recirculating in the aquaculture system would also need to be addressed. At most aquaculture facilities, there is a significant volume of effluent water being discharged, often on a continuous basis.

Since such water poses few human health risks, it should be ideal for other secondary uses, including agricultural irrigation, golf course and landscape irrigation, recreational lakes, and wetland habitat restoration and enhancement. Currently, most of the dissolved wastes are in the form of ammonia, and other nitrogenous wastes. The greater concern in this area is now with the phosphorus compounds, which are generally bound in the solids fraction.

The present invention presents a new and improved method of solid fraction removal from aquaculture effluent and method of using same. This solids fraction of the effluent may be removed by settling ponds stocked with a secondary hardy omnivorous opportunistic fish species. These bottom feeding fish will eat uneaten fish feed as well as fish fecal particulate matter which are produced by the primary production fish. These fish have been proven to be extremely efficient at consuming solids suspended in the wastewater and serve to prevent any appreciable sludge build-up in the treatment system. In practice, the use of the secondary omnivorous fish species results in an ecologically efficient, low maintenance, low cost sludge removal system.

In addition, the biomass of the secondary fish population increases sufficiently to warrant a harvest of the secondary fish as a secondary crop income with minimal or no added costs of production.

If the particulate matter is removed from the effluent, the discharge waters could be used for traditional row crop irrigation. The present invention addresses the problem of shared usage of water utilizing a new and improved method of using nutrient rich fish effluent for use by agriculture. For this use, no further treatment would be required, since the relatively low concentrations of ammonia and nitrate would act as a mild fertilizer that would enhance the production of most vegetable crops. Many fish culture operations are located in major agricultural production regions of the country where this technology could be employed.

By integrating the use of fish farm effluents with agricultural irrigation, both operations could share the water costs which results in a mutually beneficial reduction in production costs. In areas having a finite water supply, total production volumes would be enhanced. Since the only water lost in fish farming is due to evaporation and seepage, nearly all of the discharge water could be consumed by irrigation.

The present invention proposes a new and improved semi-open, cost effective aquaculture system, utilizing a secondary crop fish for solid waste removal and efficient sharing usage of water resources with improved agricultural benefits. Therefore, there would be little or no discharge of nutrients to receiving waters, which would help to eliminate eutrophication and other pollution problems, and would conserve water use in the region. With widespread secondary use of fish farm effluent, freshwater aquaculture could realize its ultimate potential, as a non-consumptive, water dependent activity capable of providing multi-beneficial uses of the country's finite water resources.

The basic design question for aquaculture water treatment and reuse is whether to attempt to modify and adapt existing municipal treatment technology to fish culture facilities, or to explore new treatment systems specifically designed to remove low concentrations of solids, BOD, ammonia, nitrate, and phosphorus from relatively high volume wastewater streams. In either case, this must be accomplished with substantially less complexity than municipal wastewater treatment, and at costs that could be supported within the low-margin agricultural commodity framework common to most forms of aquaculture.

In general, the systems used for water treatment in closed and semi-closed aquaculture systems have been based on water treatment units initially developed for treatment of municipal wastewater. Chemical treatment technologies are giving way to biological processes, due to cost considerations. Chemical treatment technologies may also create secondary pollution problems. Special physical processes such as reverse osmosis are applicable to providing tertiary water quality for municipal waste treatment where high water costs are not as important, but are completely impractical for agricultural treatment purposes.

There has been increased focus on phosphate pollution from fish culture facilities which contribute to eutrophication of receiving waters. Solids removal is receiving more attention in treatment of aquaculture effluents since phosphates are usually bound with settleable solids. Solids removal technologies involve either physical, chemical or biological removal methods. The physical methods include sedimentation basins, clarifiers, plate/tube separators, and varying filtration technologies, including bead filters. Biological solids removal methods involve anaerobic and facultative bacterial digestion.

Solids removal has not posed as great a problem for aquaculture as does the removal of dissolved nitrogenous compounds. Intensive, high density fish farming, in particular, produce large quantities of nitrogenous waste. In order to maintain high fish poundage production and consistently good tasting food fish, this constant production of nitrogen containing waste must be dealt with immediately and removed from the water coming in contact with fish.

These nitrogen containing compounds, most importantly ammonia, are typically removed utilizing biological treatment, most often with microorganisms, especially bacteria. The two basic processes of ammonia contaminant breakdown consist of nitrification and denitrification. Nitrification breaks down ammonia in solution to nitrate as follows:

$$NH_4^+ \rightarrow NO_2^- \rightarrow NO_3^- \qquad (1)$$

The oxidation of ammonia to nitrate is a two step sequential biological process involving two different autotrophic bacteria, most commonly of the genuses Nitrosomonas sp. and Nitrobacter sp. which utilize the ammonia as an energy source. The overall simplified reaction for nitrification may be expressed as:

$$NH_4^+ + 2O_2 \rightarrow NO_3^- + 2H^+ \rightarrow 2H_2O \qquad (2)$$

Denitrification then occurs if conditions are such that a denitrification facilitating anaerobic zone is presented. The denitrification process involves a reduction of nitrite to nitrogen gas through the following sequence in which bacteria, preferably heterotrophic bacteria, reduce the nitrate to a lower state of oxidation, expressed as follows:

$$NO_3^- \rightarrow NO_2^- \rightarrow NO \rightarrow N_2O \rightarrow N_2 \qquad (3)$$

During this reaction heterotrophic bacteria, which use the carbon based material as an energy source, carry out the following simplified overall reaction:

$$NO_3^- + 6H^+ + 5e^- \rightarrow 0.5N_2 + 3H_2O \qquad (4)$$

Another significant concern when recirculating aquaculture effluent is the potential for build-up of total carbon dioxide ($CO_2$) produced by fish respiration. Unless free $CO_2$ is actively removed from a culture system, it can quickly increase to toxic levels. Free carbon dioxide and the associated low pH levels are harmful to fish. The present invention presents a new and improved wastewater treatment system facilitating carbon dioxide removal from aquaculture effluent. This novel method of $CO_2$ removal will be of great use to the aquaculture industry because it accomplishes removal of the carbon dioxide in an inexpensive fashion, that does not heavily rely on the continuous addition of expensive chemicals.

Similar to aquaculture, in other water use applications, there are intensive and extensive forms of biological wastewater treatment. Intensive biological treatment involves a high technology, mechanized approach. Bacteria populations can be managed intensively in a suspended mode involving the use of aerated lagoons and oxidation ditches. Another common method for management of bacterial populations is activated sludge processes, on non-submerged media such as trickling filters or rotating biological contactors, or on submerged media such as fluidized beds and packed beds. Extensive biological treatment methods involve the use of a low technology, natural systems approach. The primary extensive methods are slow sand filtration, open ponds, managed algal ponds where algae utilize ammonia and/or nitrate, and constructed wetlands, involving aquatic plants receiving either surface flow or subsurface flow of effluent.

The concept of, and methods for aquacultural fish raising are well known and documented. Examples of different types of devices, methods and systems, water treatment units and techniques that might be suitable for aquaculture are disclosed in U.S. Pat. Nos. 5,820,759, 5,660,142, 5,593,574, 5,582,734, 5,558,763 5,061,368, 5,863,433.

Systems utilizing recycled water as a means of maintaining an aquaculture system have been explored. U.S. Pat. No. 5,820,759 describes such a system. The system contains a water hyacinth system for removal of solid and nitrogenous waste from the effluent from the fish holding area. The system also incorporates an algae based oxygenation system for water treatment.

Hyacinth systems are sensitive to temperatures and therefore their application has been limited primarily to warm weather sites. The hyacinth systems produce a heavy plant canopy which limits wind turbulence and can lead to anaerobic conditions. The high fiber content and metal levels in the plants limit their use as an animal feed supplement. Therefore, the use of water hyacinths to treat aquaculture waste is limited.

Extensive treatment technologies appear to offer the best possibilities for widespread implementation at most U.S. fish farming facilities. Therefore it would be highly desirable to have a new and improved wastewater treatment system for aquaculture products which incorporates extensive biological treatment methods for removal of nitrogenous compounds utilizing open-pond treatment systems and employing a broad temperature tolerant plant species.

Also, since the hyacinth system must have shallow water, it is difficult to remove sludge which can lead to clogging of the system and makes it difficult to harvest the plants. Therefore it would be highly desirable to have a new and improved wastewater treatment system for aquaculture products utilizing a novel particulate removal subsystem in addition to a plant-based waste removal subsystem which when working together would be low maintenance, non-fouling, and which would turn waste products into an easily harvested and marketable valuable by-product.

In addition, U.S. Pat. No. 5,820,759 incorporates an algae based treatment for dissolved contaminants as well as a required re-oxygenation of treatment waters. Algae based wastewater treatment systems are also temperature dependent, and work best only during warm weather months, posing severe limitations on year-round production.

Therefore it would be highly desirable to have a new and improved wastewater treatment system for aquaculture products which provides a predictable, consistent, stable performance, making year-round production operations optimal.

Another aquaculture system which teaches a closed system of utilizing recirculated treated water is disclosed in U.S. Pat. No. 5,660,142. Therein, a system is provided that incorporates a settling pond in which organic matter from fish pond effluent is partially degraded over a period of time.

The supernatant is fed to a fluidized bed reactor. This system requires an extended period of time in order to complete the solids settling process and the filtration of water by these means. Maintenance of the column used for the denitrification of the effluent would be relatively expensive, and would result in an extended period of time where the system could not be used during maintenance, and which would require multiple redundant fluidized bed columns should this system be used on a large scale, or a growing system scaling up, thus resulting in greatly increased overhead costs.

Therefore, it would be highly desirable to have a new and improved wastewater treatment system for aquaculture products which would provide a sequential combination of subsystems for removal of the solid particulate matter as well as the nitrogenous waste in the culture effluent. Furthermore, it would be highly desirable if such a system used a combination of low technology sequential subsystems which would remove a high percentage of contaminant compounds from the effluent, rendering the subsequent treated water useful in recirculation back to culturing operations. It would also be highly desirable if the system provided ease of operation and rapid, low capital methods of expansion to accommodate changing volumes of effluent in scaling up said aquacultural operations.

The aquaculture water treatment system disclosed in U.S. Pat. No. 5,593,574 consists of a fish tank with a double outlet. Solid waste particles are drawn into a central well by a trickle of water and conducted to a spray bar of a separate biofilter apparatus. The water is distributed over a bed of floating media pellets serving as a base for bacterial growth and subsequent nitrification of the incoming wastewater. Removal of solid wastes relies upon a spontaneous clumping of particulates and flushing of the aggregates from the system.

This system is limited by the fact that a spray bar must distribute the initial effluent evenly over the media bed. This will result in a limited amount of water that can the processed at any given point in time. The increased usage of water in a larger system would necessitate multiple such spray bars and beds of media pellets with an additional cost in equipment and maintenance. The spray bar arm is provided with small openings from which the effluent water is emitted, which would lend itself to clogging and more frequent cleaning and higher maintenance costs.

Therefore, it would be highly desirable to have a new and improved wastewater treatment system for aquaculture products which would utilize multiple methods of particulate removal, use waste produced in primary operations to produce a secondary marketable aquacultural product to offset overhead costs, provide ease of operation and rapid, and low capital methods of expansion to accommodate changing, increasing volumes of effluent, especially from rapid scaling up of operations.

As previously mentioned, many of the inventive systems utilized by aquaculture up until very recently have been fashioned after equipment systems based on municipal wastewater treatment applications. These systems were designed to process wastewater containing high levels of particulates and contaminants. The resulting treated water was meant to be released into the environment and not particularly designed to meet the high water quality standards required in more sensitive recirculating aquaculture systems. Many of these systems were designed to accommodate large amounts of wastewater and require high capital and high maintenance which would be unfeasible for the relatively low margin agricultural and aquacultural production operations.

The invention in U.S. Pat. No. 5,582,734 describes a municipal wastewater treatment system which relies upon an oxidation ditch to remove settleable solids and nitrogen removal. The process incorporates a mixer in the oxidation ditch which enables independent aeration and mixing. While this process provides for rapid expansion to accommodate changing volumes of effluent, the process is controlled by a microprocessor-based automated control system which could result in high installation, labor and maintenance costs. Additionally, traditional oxidation ditch technology is relatively ineffective in aquaculture applications. The reason for this is in aquaculture effluent there is so little particulate waste that there is insubstantial surface area for the attachment of a bacterial film.

Therefore, it would be highly desirable to have a new and improved wastewater treatment system for aquaculture products which would provide ease of operation, low initial capital outlay and low subsequent everyday operating costs.

Another sewage treatment system is described in U.S. Pat. No. 5,558,763 which filters solid components in the wastewater by using a floating filter medium. The system utilizes two air jetting means. The first air jets separate the floating media from solid sewage components and the second air jet ensures that the solid component does not adhere again.

Again, the system here was designed to accommodate wastewater with large amounts of particulate material. The air jets are provided for elimination of the solid component from the wastewater in an efficient manner. Then, a second sedimentation tank with a partitive plate is provided for further sedimentation. The primary concern of this system is efficient removal of large amounts of sediment, which for public health reasons cannot have secondary usage as nutrients for plant or animal populations.

Therefore, it would be highly desirable to have a new and improved wastewater treatment system for aquaculture products which would provide a method by which particulates in the wastewater stream would be partially removed by nutrient utilization in plants and animals, producing a secondary harvest of a valuable marketable product, as well as partially purified water for secondary uses and highly purified water for recirculation back into culture operations.

In the above-mentioned patent, the subsequent treated wastewater is not of sufficient quality required in aquaculture recirculation. Thus, it would also be highly desirable that such an inventive system utilize multiple stages, or sequential subsystems, consisting of low technology treatments for removal of dissolved contaminants which could produce off-flavor in primary production fish or render the primary production fish more susceptible to diseases.

U.S. Pat. No. 5,061,368 discloses another system for treating wastewater. In the system, a particulate body formed by covering and fixing nitrifying bacteria is inserted in a nitrifying vessel which includes an air diffusion device for supplying oxygen to the nitrifying bacteria. The wastewater is circulated between the nitrifying vessel unit and a biological reaction vessel.

In this interesting invention, a multiplicity of nitrifying vessels would be required in order to accommodate an increased level of wastewater. In addition, a separate unit is required for anaerobic biological treatment of effluents. Thus, costs of equipment for larger volumes of water treatment would be prohibitive and much time consumed during installation. Any attempt at scaling up operations would greatly increase overall production and overall operating costs.

Therefore, it would be highly desirable to have a new and improved wastewater treatment system for aquaculture products which would provide multiple low technology sequential subsystems which would be capable of varying effluent volumes, provide ease of operation, and be readily scalable yet maintain low capital and operating costs of up scaling production.

The use of constructed wetlands for treatment of storn water runoff and municipal wastewater is well known. An efficiently operated constructed wetlands ecosystem can be a cost effective method of ammonia, nitrate and suspended solids removal in treatment of wastewater.

The invention described in U.S. Pat. No. 5,863,433 relates to the design and operation of a constructed subsurface-flow wetlands for such a purpose. This wetland utilizes an undergravel filter to handle large amounts of particulate matter present in municipal waste water. The wetlands disclosed here do not specify any type of aquatic plants for bioremediation of wastewater.

While this novel concept adequately addresses the requirements for treatment of large quantities of municipal wastewater that is high in particulate matter, and the resulting treated water is sufficiently free from harmful contaminants to release into the environment, it would not be sufficient alone to meet the water quality requirements of a recirculating aquaculture system. Moreover, subsurface-flow wetlands can be prone to clogging, but more importantly, are much more capital intensive to construct. They also do not permit gas exchange freely, including exchange of both $O_2$ and $CO_2$, and therefore, by limiting $O_2$, nitrification is limited as well.

Therefore, it would be highly desirable to have a new and improved wastewater treatment system for aquaculture products which would provide a series of low technology sequential treatment stages which would result in an effluent of sufficient quality as required to prevent aquacultural product contamination, off-flavors, parasites, devastating diseases and other related problems associated with intensive fish rearing.

SUMMARY OF THE INVENTION

Therefore, the principal object of the present invention is to provide a new and improved semi-open aquaculture wastewater treatment system consisting of a series of cost effective, low technology, sequential water treatment subsystems, having a more effective and efficient means for the removal of particulates and nitrogenous compounds in aquaculture effluents as well as providing a flexible, easily expandable and affordable treatment of wastewater that would be of sufficient quality for use in numerous other applications. Moreover, the principal object of the present invention is to provide a new and improved sequential method of wastewater treatment comprising three wastewater treatment subsystems. The subsystems incorporate a solids/particulate removal subsystem, a suspended media ammonia removal biofilter reactor subsystem, and a constructed wetlands water polishing subsystem to complete the removal of particulates and nitrogenous compounds.

It is a further object of the present invention to provide such a new and improved system for the treatment of wastewater that incorporates a subsystem utilizing an omnivorous secondary fish species for particulate removal solids removal, and which produces a harvestable secondary fish crop for offsetting operating costs. In this subsystem of solids removal, elongated fish raceways stocked with a secondary hardy detritivorous opportunistic fish species, such as tilapia and/or carp, would represent a more effective and efficient removal of solids and particulates from the aquaculture effluent as well as providing a continuous economic gain.

It is yet a further object of the present invention to provide such a new and improved wastewater treatment system in which soluble nitrogenous compounds are readily removed by a subsystem integrating an open-ditch biofilter reactor containing polyurethane foam and/or plastic (such as extruded pipe) suspended support media for the support and growth of microorganisms active in the ammonia removal process. This unique and very effective suspended media ammonia removal technology system is known as the SMART system. The SMART subsystem includes a foam or plastic media providing a floating matrix for the growth of microorganisms including nitrifying bacteria, along with a paddlewheel which provides circulation and aeration of the water, as well as partial removal of solubilized carbon dioxide from wastewater in a cost effective and efficient manner.

It is a further object of the present invention to provide such a new and improved wastewater treatment system and method of making same, that incorporates a constructed wetlands subsystem for further removal of nitrogenous compounds and remaining suspended solids, and which does so by delivering the wastewater to a series of large, shallow earthen ponds containing numerous aquatic plant species which have a broad temperature tolerance. This constructed wetland pond incorporates extensive biological treatment methods for removal of nitrogenous compounds. In this way, this third wastewater treatment subsystem provides a low technology, cost effective and efficient means of further removal of ammonia and remaining suspended solids from aquaculture operations effluents.

It is yet another object of the present invention to provide such a new and improved treatment of wastewater utilizing sequential multiple, low technology, cost effective subsystems in which customized combinations of one or more of each of the novel wastewater treatment system subsystems can be configured, as required by varying applications and climates, as well as varying water resource and aquacultural/agricultural conditions.

Briefly, the above and further objects of the present invention are realized by providing a new and improved system for the treatment of wastewater to enable effective and efficient removal of suspended solids, nitrogenous contaminants such as ammonia, and dissolved carbon dioxide, by using integrated, cost effective, low technology sequential water treatment subsystems.

A novel wastewater treatment system is provided including three subsystems. The first subsystem is comprised of a fish raceway solids removal channel populated with relatively high densities of a detritivorous fish such as tilapia or carp, that have high potential as an efficient means of feeding on, and thereby, removing suspended solids and particulate matter that are present in the primary fish production effluent. This step removes approximately 30% of the suspended solids before further decomposition to form more harmful and toxic compounds such as ammonia. In addition, the present invention accomplishes removal of solids while also allowing production of a secondary crop fish which can be harvested and sold to offset expenses. Moreover, this treatment of wastewater contaminants occurs without the use of potentially polluting chemicals or costly equipment, while facilitating production of the more valuable primary fish crop.

The second wastewater treatment subsystem is comprised of an enhanced form of nitrifying reactor called the Suspended Media Ammonia Removal Technology (SMART) biofilter reactor system. This water treatment component consists of an oval-shaped concrete tank in which the water is circulated by means of a large hydraulic or electrically powered paddlewheel. The water column contains a number of polyurethane foam particles cut into cubes, spheres or other shapes and/or plastic carriers such as cut extruded pipe, that provide an increased well-aerated surface area for the support and growth of microorganisms including nitrifying bacteria. The supported bacteria break down ammonia, the most common and most toxic compound present in fish culture effluent, to less toxic nitrogenous compounds such as nitrate. The SMART biofilter reactor units are capable of removing at least 40% of the total ammonia present in the aquaculture effluent. Furthermore, SMART biofilter reactors are readily and economically scalable to any wastewater treatment application requirements.

The third wastewater treatment subsystem in the novel sequential water treatment process includes a series of constructed wetlands ponds. Pre-treated effluent from the SMART subsystem is delivered to large, shallow earthen ponds that are planted with mature bulrush plants (Scirpus sp.). This water polishing subsystem is capable of removing up to 40% of the remaining ammonia and nearly all of the remaining suspended solids. Moreover, constructed wetland ponds are readily and economically scalable to meet the demands of any wastewater treatment application.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein.

DESCRIPTION OF THE PREFERRED EMBODIMENTS

Figure 1:
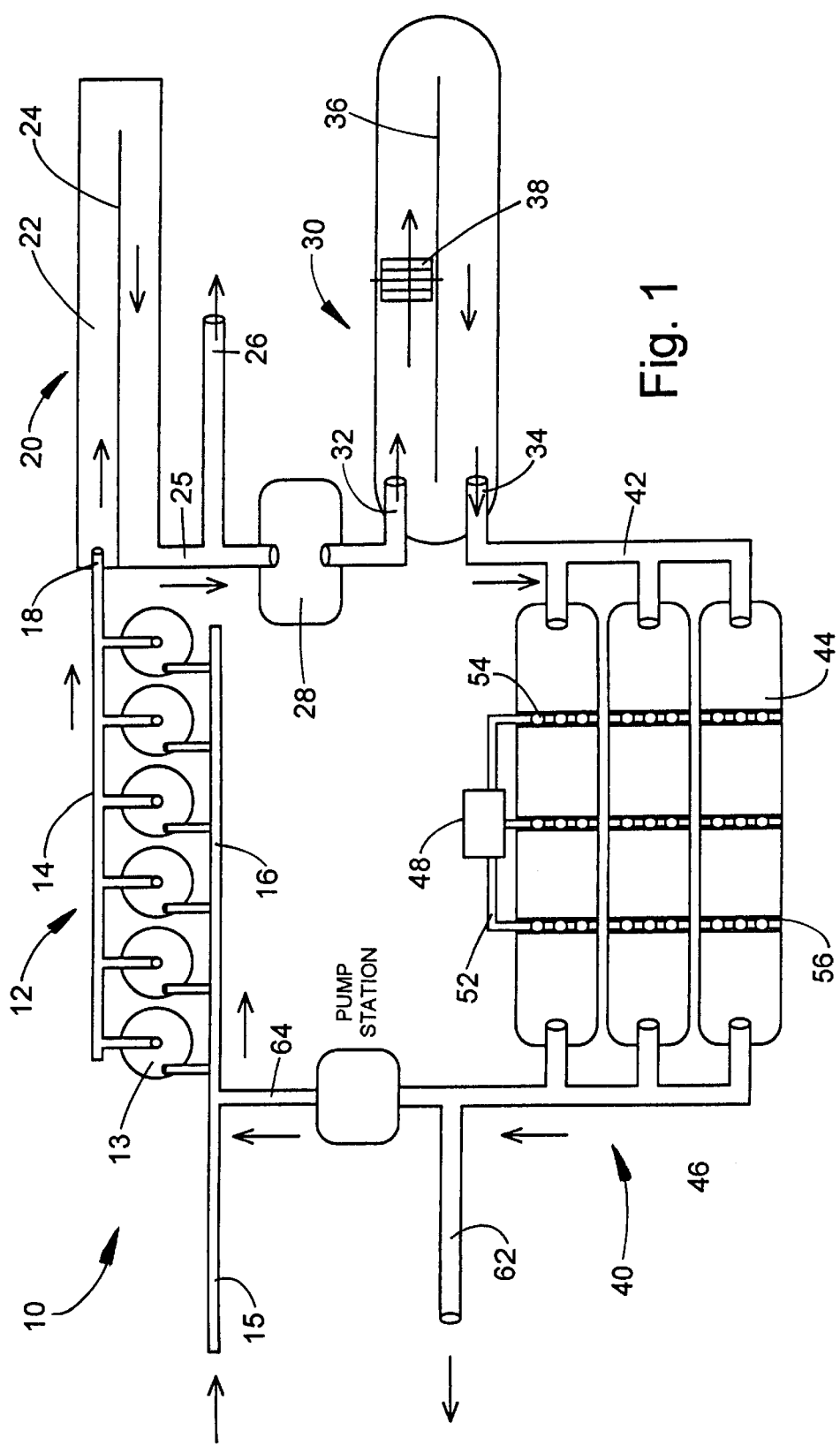
FIG. 1 is a schematic and diagrammatic view of the overall semi-open wastewater treatment system constructed in accordance with the present invention, illustrating the inter-connectivity of the three integrated subsystems and the path of water flow through each wastewater treatment subsystems.

Referring now to the drawings, and more particularly to FIG. 1 thereof, there is shown a new wastewater treatment system 10 which is constructed in accordance with the present invention. The novel wastewater treatment system 10 is used to remove both particulates and nitrogenous compounds from wastewater. The wastewater is simultaneously circulated and maintained at a high quality level within a semi-closed system, for example as in an aquaculture system.

The wastewater treatment system 10 is shown here in its typical environment associated with an aquaculture operation. The flow of water through the wastewater treatment system 10 as depicted in FIG. 1 is indicated by arrows. Included are the fish rearing tank array 12 including numerous individual fish production tanks such as fish production tank 13, fish production tank outlet piping 14, freshwater source piping 16 and solids removal channel inlet 18.

The novel wastewater treatment system 10 is constructed of three subsystems. The first subsystem is the organism-based, typically fish-based particulate removal component, which includes the solids removal channel 22, which includes the channel dividing wall 24, solids removal channel outlet 25 and secondary water use diversion pipe 26 and also includes an optional secondary solids removal component 28. The second subsystem is the suspended media ammonia removal technology (hereinafter "SMART") biofilter reactor 30. This subsystem includes the SMART biofilter reactor inlet 32 and the SMART biofilter reactor outlet 34, a bioreactor dividing wall 36, and a paddlewheel water circulator 38. The third subsystem of the wastewater treatment system 10 is the constructed wetlands 40. This subsystem is composed of a constructed wetlands inlet piping 42, a series of constructed wetland ponds, as exemplified by wetland pond 44, a constructed wetlands outlet piping 46, an air or oxygen injection system 48, pond aeration piping 52, pond aeration head 54, and pond aeration subsurface channel 56. Treated water is then sent to an off-site outflow pipe 62 or via a pump station through treated water return pipe 64 and back to the fish rearing tank array 12.

Referring now to FIG. 1 in greater detail, the components making up the exemplary aquaculture system are a fish rearing tank array 12 composed of individual fish production tanks 13 in which primary production fish, such as hybrid striped bass, are grown at high population densities. A portion of the effluent from these fish rearing tanks 13 is removed from the tanks for bioremediation via the fish production tank outlet piping 14. A replenishment of fresh water is introduced into the fish rearing tank array 12 via the freshwater source piping 15 and is delivered to individual fish production tanks 13 by way of the fish production tank inlet piping 16. The effluent from the fish rearing tank array 12 is delivered to the first wastewater treatment subsystem, namely, the organism-based, typically fish-based particulate removal component 20 through the solids removal channel inlet 18.

The organism-based, typically fish-based particulate removal component 20 is composed of a solids removal channel 22. This solids removal channel 22 is an elongated raceway populated by a detritivorous fish species such as tilapia or carp which remove approximately 30% of the suspended solids from the effluent before the suspended solids can further decompose and create more harmful and toxic compounds such as ammonia. The solids removal channel 22 divided by a channel dividing wall. The resulting division of the solids removal channel 22 into two smaller channels, allows bi-directional flow of the effluent, increasing the retention time within the solids removal channel 22, thus increasing the length of time during which the detritivorous fish species are able to consume the suspended particulates from the effluent. After passing through the solids removal channel 22, the effluent exits the fish-based particulate removal component 20 through the solids removal channel outlet 25. Here the effluent may be either diverted for agricultural or landscape uses via the secondary water use diversion pipe 26, enter a secondary solids removal component 28 for further solids removal or go directly to the next wastewater treatment subsystem. The secondary solids removal component 28 may consist of a number of conventional methods of solids removal such as more traditional physical solids removal systems, or more innovative processes like floating bead filters.

The wastewater is then delivered to a second wastewater treatment subsystem, the suspended media ammonia removal technology or SMART biofilter reactor 30, from the fish-based particulate removal component 20 via the SMART biofilter reactor inlet 32 and exists by way of the SMART biofilter reactor outlet 34. The SMART biofilter reactor 30 is composed of a large oval-shaped tank subdivided into bi-directional channels by the bioreactor dividing wall 36, within which vessel the water is kept moving by means of a large paddlewheel water circulator 38.

The SMART biofilter reactor 30 contains suspended media for the support and growth of microorganisms, including nitrifying bacteria. These support media components, also known as biomass carrier structures can be constructed from a variety of materials into a variety of shapes and sizes. For example, natural or artificial materials can be used, such as sand, sponges, or synthetic foams, both open-celled and close-celled foams, and extruded plastics, both specially designed extruded plastic and recycled waste plastic. One embodiment contemplates extruded plastic pipe cut into certain short lengths. This pipe can be shaped so as to increase the surface area available to microorganisms for maximum growth. While the pipe may be constructed of plastic materials such as polyethylene or polyproylene, other materials are also contemplated as well as the mixing of certain additives to the plastic material to alter density.

Another embodiment contemplates biomass carriers comprised of polyurethane foam cut into cubes, spheres, or other regular and non-regular shapes, that provide a large amount of well-aerated surface area for the support and growth of microorganisms, including nitrifying bacteria. These bacteria oxidize ammonia, the most common and most toxic compound present in fish culture effluent, metabolizing the ammonia into less toxic nitrogenous compounds such as nitrate.

The partially treated effluent is then delivered to the third wastewater treatment subsystem, the constructed wetlands 40, via the constructed wetlands inlet piping 42. After treatment within the constructed wetlands ponds 44, the water exits the constructed wetlands 40 by means of the constructed wetlands outlet piping 46. The constructed wetlands ponds 44 are large, shallow earthen ponds, that are established and maintained with any number of macrophytic plant species, such as bulrush plants (Scirpus sp.). This polishing step is capable of removing a large portion of the remaining ammonia and/or total nitrogen, and nearly all of the remaining suspended solids. In addition, the open ponds are constructed with an air or oxygen injection system 48 comprised of pond aeration piping 52 with multiple pond aeration heads 54 which are located in a pond aeration subsurface channel. The use of the oxygen injection system 48 is an effective, inexpensive and non-polluting means of adding oxygen for nitrification and for removing carbon dioxide by stripping the gas out of the water. The solubilized carbon dioxide in untreated water, and associated low pH levels, are harmful to fish.

Finally, the treated water may be either diverted to high quality treated water secondary uses through the treated water off-site outflow pipe 62 or delivered for recirculation via the treated water return pipe 64 for re-use in the fish rearing tank array 12 for primary fish production operations.

The novel wastewater treatment system 10 comprised of the three sequential subsystems, the fish-based particulate removal component 20, the SMART biofilter reactor 30, and the constructed wetlands 40 work together in conjunction with one another to provide integrated and efficient, low cost removal of particulates, nitrogenous compounds and carbon dioxide.

Figure 2:
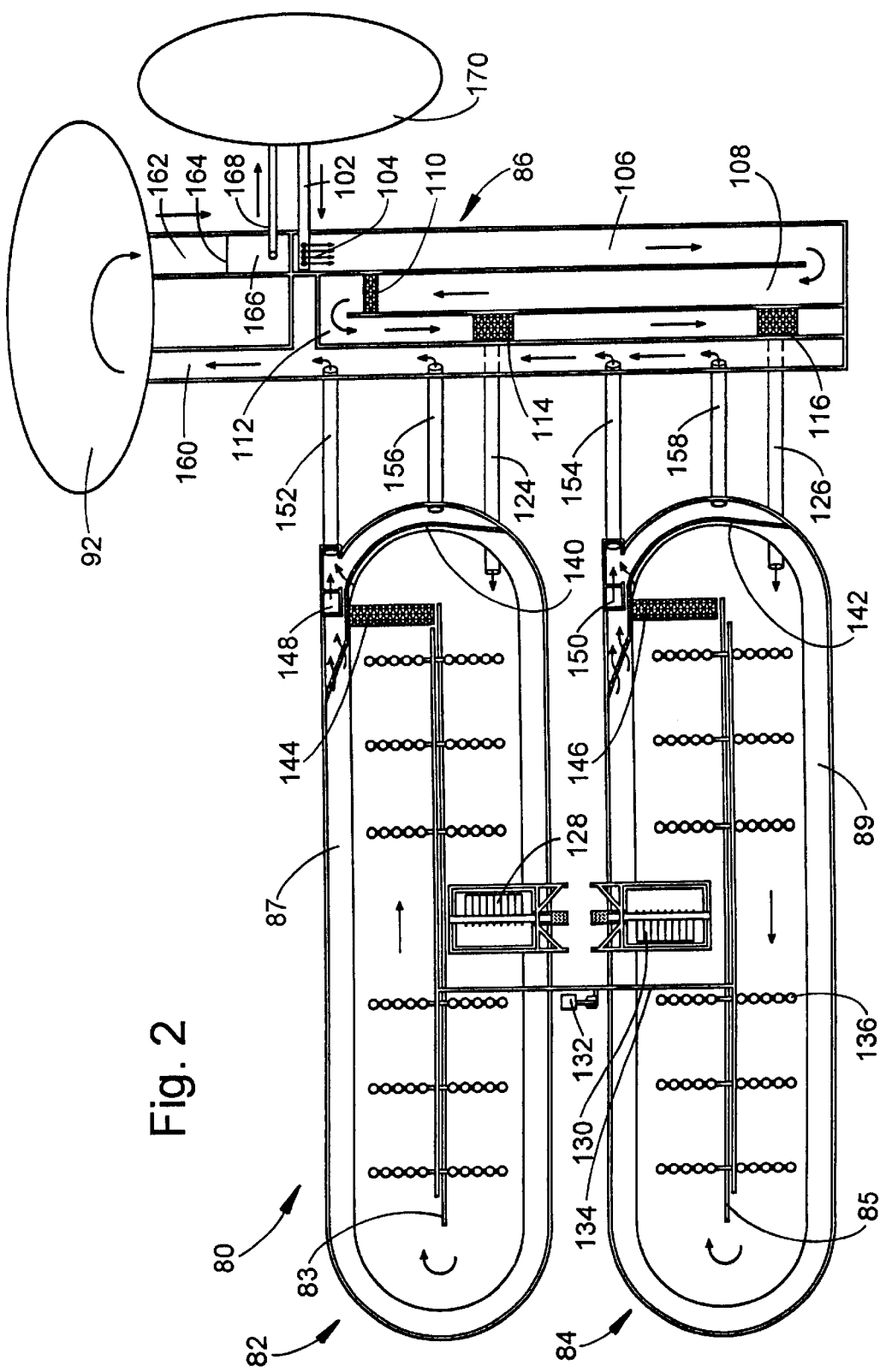
FIG. 2 is a partially schematic and diagrammatic top plan view of a dual side-by-side SMART biofilter reactor configuration connected to the solids removal channel, constructed in accordance with the present invention, illustrating the flow of water to be treated therein, into and out of the dual SMART biofilter reactors.

Referring now to FIG. 2, this illustration provides a more detailed view of the integrated solids removal channel (hereinafter "SRC") and the dual SMART biofilter reactors 80 used for the treatment of wastewater. The flow of the wastewater through the integrated SRC and the dual SMART biofilter reactors 80 is indicated by the arrows. This embodiment of the SMART biofilter reactors in this figure contains a first SMART biofilter reactor 82 which is bifurcated by a center dividing wall 83. A second SMART biofilter reactor 84 is also divided into bidirectional water flow channels by a center dividing wall. Depending on treatment application and required volumes of wastewater to be treated, any number of SMART bioreactors can be configured in the same way as the dual configuration as shown. The SMART subsystem is economical to construct and maintain making scaling up to large volume operations less expensive than prior art wastewater treatment systems.

Prior to delivery into the SMART biofilter reactors 82, and 84 the wastewater is treated in a solids removal channel (SRC) 86 containing a secondary detritivorous fish species which consumes a large portion of the suspended solids in the wastewater. The suspended solids are composed largely of fish waste and uneaten fish food and if not removed from the wastewater, will degrade into more toxic substances such as ammonia. After approximately 30% of the solid particulates are removed in the SRC, the wastewater is delivered to the SMART biofilter reactors 82, and 84.

The SMART biofilter reactors 82, and 84 are elongated cement open ditch structures having an oval-shaped and sloping side walls 87 and 89, respectively. The SMART biofilter reactors 82, and 84 are an enhanced form of nitrifying reactor used for the conversion of ammonia to nitrate. Side walls may be perpendicular to the bioreactor vessel floor or sloped up to 45 degrees to provide increased volume and water flow.

After undergoing aerobic nitrification (the oxidation reaction in which Nitrobacter and Nitrosomonas bacteria convert ammonia contamination in effluents to nitrate) within the SMART biofilter reactors 82 and 84, the partially treated wastewater is delivered to a constructed wetlands component 92. Here, a final polishing step is performed where virtually all of the rest of the suspended solids and up to 40% of the remaining ammonia and/or total nitrogen is removed from the wastewater. Within the aerated wetland ponds, additional nitrification occurs. In non-aerated ponds, an anaerobic denitrification reaction occurs by which nitrate undergoes conversion to nitrogen gas through the action of heterotrophic bacteria (such as Clostridium sp. and Pseudomonas sp.). The treated wastewater may be mixed with new or make-up water and returned to the primary fish production units. Such denitrification also has the added benefit of restoring water alkalinity which has been altered (lowered, made more acidic) as a normal function of fish metabolism and bacterial nitrification processes.

The wastewater from the primary fish production units exits the primary fish production tanks 170 via the fish production effluent outlet 102 and enters the solids removal channel 86 by means of the SRC effluent inlet 104. The wastewater flows along the first channel raceway 106 and a second channel raceway 108. The first and second channel raceways 106 and 108 are maintained with a secondary population of detritivorous fish which consume the suspended solids contaminants in the wastewater. A secondary fish retaining screen 110 provides a physical barrier in order to retain the detritivorous fish within the confines of the first and second channel raceways 106 and 108.

The partially treated wastewater enters the SMART biofilter reactor inlet channel 112. Here, the partially treated wastewater flows through floor screens 114 and 116 and into a first SMART biofilter reactor inlet pipe 124 and a second SMART biofilter reactor inlet pipe 126. Once in the first SMART biofilter reactor 82, the partially treated wastewater is kept flowing along the elongated raceway by means of a powered paddlewheel assembly 128. Similarly, the partially treated wastewater entering the second SMART biofilter reactor inlet pipe into the second SMART biofilter reactor 84 is propelled down the length of the channel by means of a powered paddlewheel assembly 130.

The partially treated wastewater is subjected to previously described nitrification reactions within the confines of the first and second SMART biofilter reactors 82 and 84. Polyurethane foam or plastic in various regular and irregular shapes suspended in the SMART biofilter reactors 82 and 84 and act as a support for growth of microorganisms such as nitrifying bacteria and nitrogen-fixing biomass. These bacteria remove substantial amounts of solubilized ammonia by metabolizing the ammonia to form nitrates. The SMART bioreactor vessel is kept in continuous motion at an effluent flow velocity of about 0.15 to about 2.00 cubic feet per second.

In addition to the removal of ammonia from the wastewater, the SMART biofilter reactors 82 and 84 remove significant amounts of carbon dioxide from the wastewater. The carbon dioxide is a naturally occurring metabolic product of fish respiration and may rise to toxic levels if left in solution and not removed. The carbon dioxide also decreases pH levels of the water which can reach unacceptable parameters in aquaculture systems.

The SMART biofilter reactors 82 and 84 are equipped with a diffused air system blower 132 which supplies air to the diffused air system piping 134. The air then bubbles out of the diffused air system piping 134 through the diffused air system aeration heads 136. The diffused air system piping 134 and the diffused air system aeration heads 136 providing aeration in the partially treated wastewater allow for carbon dioxide release, thereby successfully keeping carbon dioxide levels below toxic levels. Approximately 14–17% of the carbon dioxide present in the wastewater is stripped without the use of expensive and potentially caustic acidification techniques. This removal of the carbon dioxide from the partially treated wastewater makes the treated wastewater of a quality that is useful for recirculation in an aquaculture system which requires low level of toxic carbon dioxide and higher pH levels in effluents.

The partially treated wastewater exits the first SMART biofilter reactor 82 by passing through the vertical media retaining screen 140. This screen allows free flow of the wastewater while maintaining the suspended polyurethane or extruded pipe support media within the confines of the first SMART biofilter reactor 82. In addition, a portion of the treated wastewater exits the first SMART biofilter reactor 82 through the SMART biofilter reactor outlet pipe 156. Similarly, wastewater treated in the second SMART biofilter reactor flows through the vertical media retaining screen 142 before exiting the vessel through outlet pipes 154 and 158.

Remaining suspended solids which form aggregates fall to the bottom of the first SMART biofilter reactor 82 and are gravity fed though a floor screen 144 and removed by an auger into an auger pit 148. These suspended solids aggregates are then removed for secondary use. Similarly, the remaining suspended solids are removed from the second SMART biofilter reactor via the floor screen 146 and the auger pit 150.

Some partially treated effluent may then exit the SMART biofilter reactors 82 and 84 through the auger pit outlet pipes 152 and 154, respectively. Additional partially treated water may exit through the SMART biofilter reactor outlets 156 and 158. From the SMART biofilter reactor outlets 156 and 158 the partially treated wastewater enters the SMART treated water channel 160. The SMART treated water channel 160 conveys the partially treated wastewater to the constructed wetlands 40 for further polishing.

After treatment in the constructed wetlands 40, the treated wastewater exits the constructed wetlands through a treated water return 162. The treated wastewater passes through a treated water return intake screen 164 prior to entering the recirculation pump station 166. The treated wastewater is then delivered to the primary fish production tanks 13 through a fish production tanks inlet 168.

Figure 3:
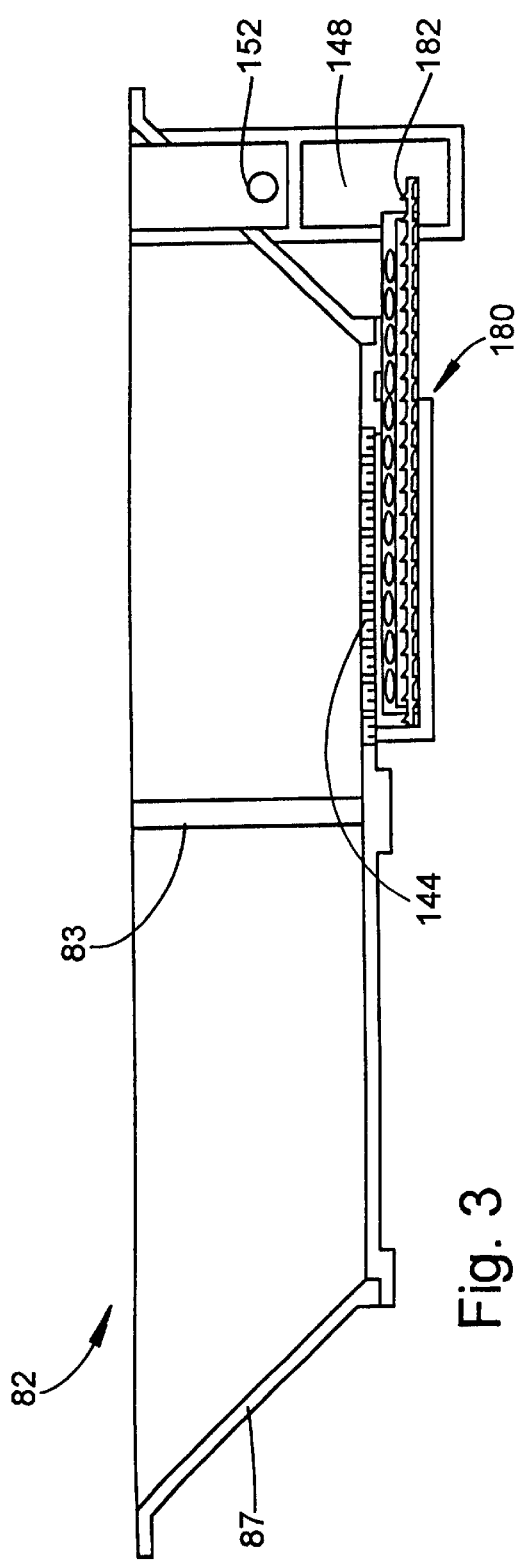
FIG. 3 is an enlarged sectional view of the SMART biofilter reactor structure constructed in accordance with the present invention, illustrating the floor screen and auger assembly.

Referring now to FIG. 3, a cross sectional view of the proximal D-shaped end of the first SMART biofilter reactor 82 is shown in greater detail. The oval-shape and sloping side wall 87 serves to contain the partially treated wastewater as it circulates in the first SMART biofilter reactor 82. The elongated raceway is divided into two bi-directional channels by a center dividing wall 83. The floor screen 144 allows the gravity feeding of aggregates of solid particulates to enter the sediment removal assembly 180. The auger 182 removes the aggregates of solid particulates to the auger pit 148. The auger pit outlet 152 conveys partially treated wastewater from the first SMART biofilter reactor 82 for further treatment.

Figure 4:
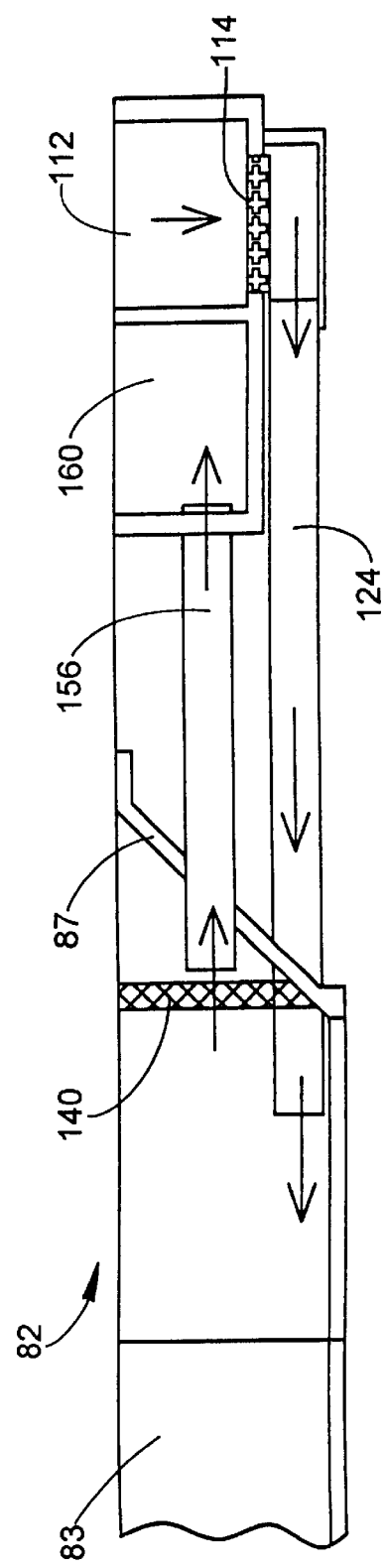
FIG. 4 is an enlarged partial longitudinal sectional view of the SMART biofilter reactor structure constructed in accordance with the present invention, illustrating the inlet and outlet piping as well as the vertical suspended media retaining screen and inlet floor screen.

Referring now to FIG. 4, this figure depicts a cross sectional view of the flow path of partially treated wastewater from the SMART biofilter reactor inlet channel 112 through the floor screen 114 and into the first SMART biofilter reactor inlet pipe 124. The partially treated wastewater enters the first SMART biofilter reactor 82 and courses down one of the channels created by the presence of the center dividing wall 83. After circulating through the first SMART biofilter reactor 82, the partially treated wastewater exits the first SMART biofilter reactor 82 by passing though the vertical media retaining screen 140. The partially treated wastewater enters the SMART biofilter reactor outlet 156 which transverses the oval-shaped sloping side wall 87 of the first SMART biofilter reactor 82. The SMART treated water channel 160 then transports the partially treated wastewater to the next subsystem for further treatment.

Figure 5:
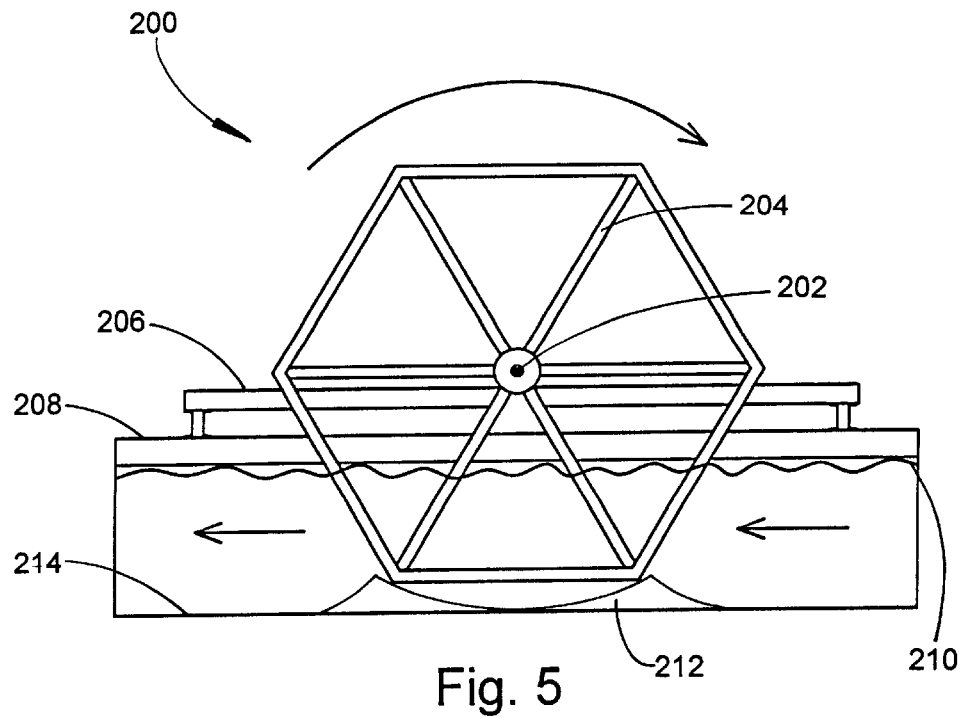
FIG. 5 is a side elevational view of the paddlewheel water circulator assembly constructed in accordance with the present invention.

Referring now to FIG. 5, additional detail of the paddlewheel water circulator component of the SMART biofilter reactor 82 is depicted. The paddlewheel water circulator 200 is located in the second channel portion the first SMART biofilter reactor 82. Additionally, the paddlewheel may be positioned anywhere along the bioreactor vessel. The paddlewheel water circulator 200 is supported and powered by means of the paddlewheel drive shaft 202. The paddle arms 204 provide a mechanical means of increasing water flow velocity. The paddlewheel water circulator 200 is supported by means of the support beam 206 which raises the mechanism above the level of the vessel wall top 208 and the waterline 210.

Increased circulation and flow patterns are achieved by use of the paddlewheel water circulator 200 and the associated specially designed volute 212 which rests on the vessel floor 214. The resultant increased circulation and flow patterns from the use of the paddlewheel water circulator 200 allow maintenance of increased amounts of suspended polyurethane foam, extruded plastic pipe, or other biomass carrier media in the first SMART biofilter reactor 82. In addition, the paddlewheel water circulator 200 provides diffusion aeration required for nitrification and removal of carbon dioxide. One or more paddlewheel components may be employed per bioreactor vessel.

Figure 6:
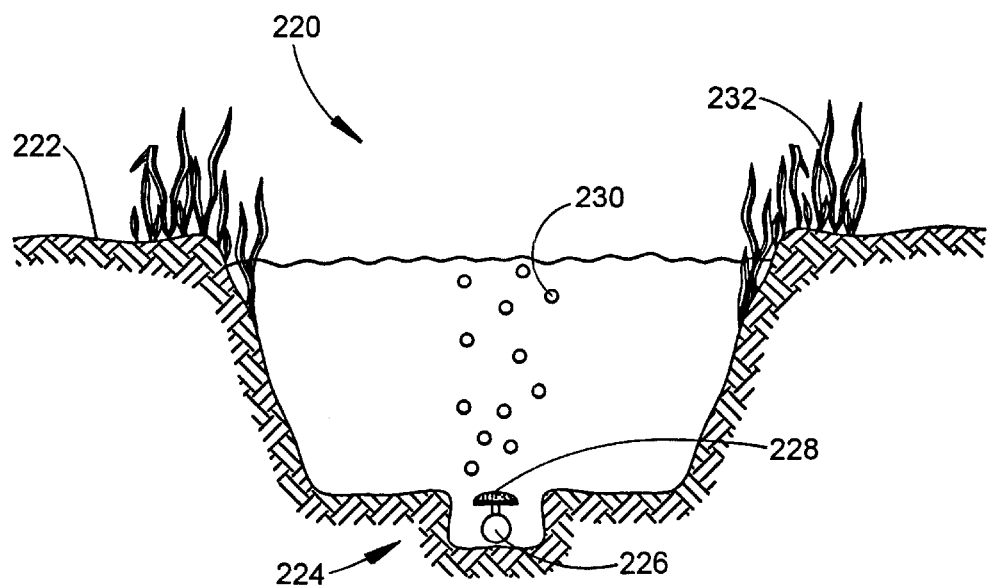
FIG. 6 is a vertical cross-sectional view of one constructed wetlands pond constructed in accordance with the present invention, illustrating the aeration channel, aeration supply piping and aeration head.

Referring now to FIG. 6, a cross sectional view of a constructed wetland pond 220 shows a shallow pond with earthen pond banks 222. A pond aeration subsurface channel 224 holds pond aeration piping 226. A multiplicity of pond aeration heads 228 provides diffusion for the air supplied through the pond aeration piping 226 and allows air or oxygen bubbles 230 to diffuse and disperse as they pass through the partially treated wastewater in this polishing stage. The constructed wetland pond 220 maintains a population of macrophytic wetland plant growth 232 such as bulrush (Scirpus sp.)which provide for a physical barrier for remaining suspended solids as well as removal of total nitrogen concentrations including toxic nitrite concentrations through denitrification processes which might be present in the partially treated wastewater. In addition, the alkalinity of the partially treated wastewater is increased as a by-product of the denitrification processes.

The aeration provided to the constructed wetland pond 220 provides additional stripping of carbon dioxide present in the partially treated wastewater as well as oxygen for the nitrifying bacterial population which removes ammonia by aerobic metabolic processes. This final polishing treatment for the partially treated wastewater removes up to 40% of the remaining nitrogenous wastes including ammonia, as well as virtually all of the remaining solid particulates.

Figure 7:
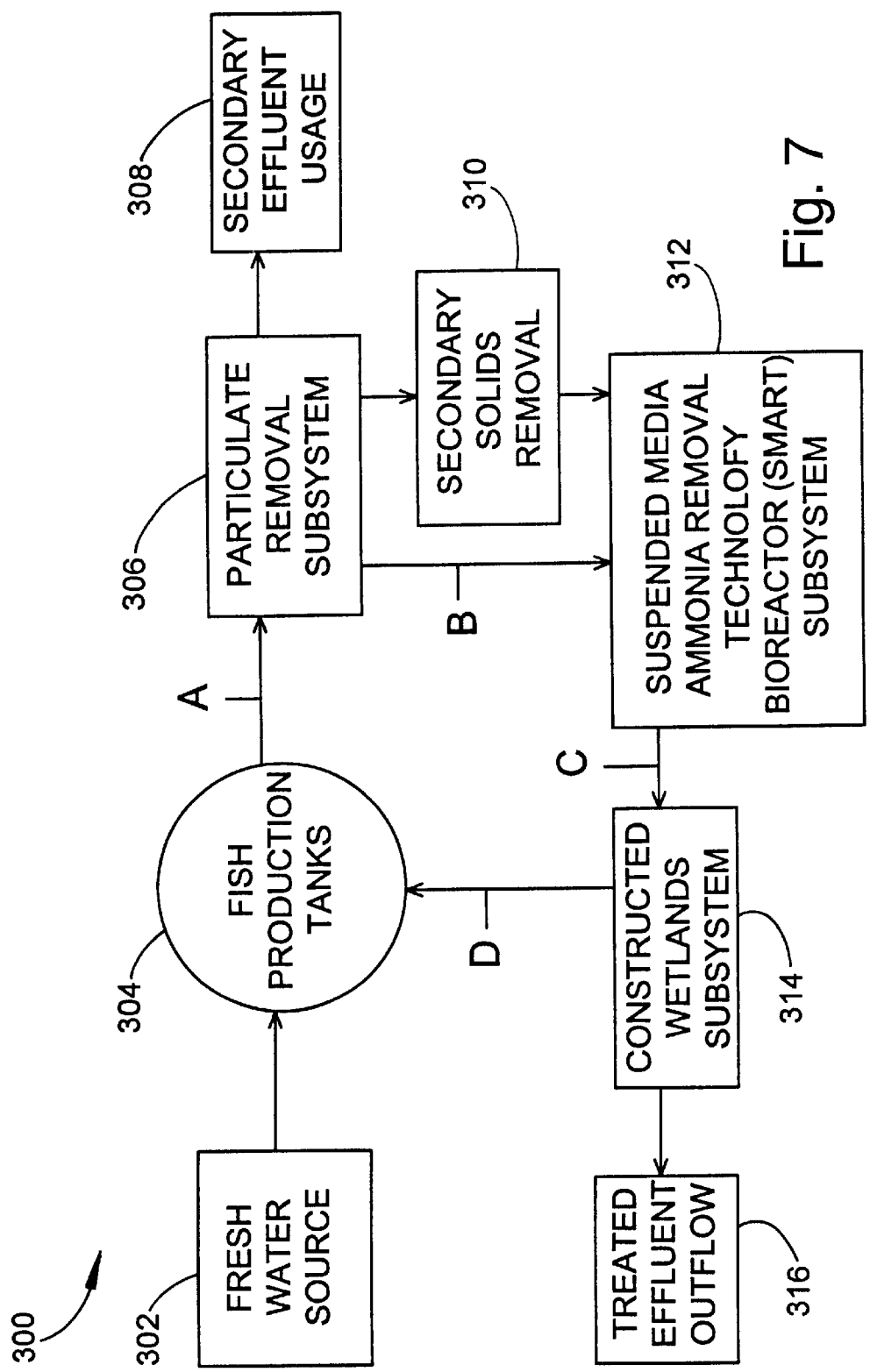
FIG. 7 is a block diagram illustrating the interrelationships between the three subsystems making up the overall semi-open aquaculture wastewater treatment system and secondary water usage or off-site treated water outflow.

Referring now to FIG. 7, there is shown a block diagram illustrating the interrelationships between the three subsystems making up the overall semi-open aquaculture wastewater treatment system 300, and secondary effluent usage 308 or off-site treated water outflow 316.

The primary fish production tanks 304 are supplied with new unused water from a new water source 302. A secondary solids removal step 310 may or may not be located between the particulate removal subsystem 306 and the SMART bioreactor subsystem 312. This would depend on the extent and content of the solids present within the system at this point. Overloading of the SMART bioreactor with excessive solids should be avoided. Furthermore, this SMART system can potentially be employed in brackish or seawater applications.

At sample points A, B, C and D, effluent samples were taken for chemical analysis to determine the changes in chemical parameters and to monitor the ammonia levels within the wastewater treatment subsystems.

More specifically, Sample point A is located between the primary fish production tanks 304 and the particulate removal subsystem 306. Sample point B is located between the particulate removal subsystem 306 and the SMART bioreactor subsystem 312. Sample point C is located between the SMART bioreactor subsystem 312 and the constructed wetlands subsystem 314. Finally, sample point D is located between the constructed wetlands subsystem 314 and the primary fish production tanks 304.

Table 1. and Table 2. below contains a compilation of said chemical analysis data, illustrating the effectiveness of the overall system in removing contaminants from the effluent.

TABLE 1

Volatile Suspended Solids (VSS) Treatment Data

| Treatment Component | Influent VSS Concentration (mg/l) | Effluent VSS Concentration (mg/l) | VSS Removed (mg/l) | VSS Removed (%) |
|---|---|---|---|---|
| Particulate Removal System | 20.6 (Sample Point A) | 13.6 (Sample Point B) | 7.0 | 34% |
| Contructed Wetlands | 9.8 (Sample Point C) | 3.9 (Sample Point D) | 5.9 | 60% |

TABLE 2

Treatment System Water Quality Concentration Data

| Sample Point | Sample Point Description | Inorganic Nitrogen NH3-N (mg/l) | NO2-N (mg/l) | NO3-N (mg/l) | Total (mg/l) | Organic Nitrogen (mg/l) | Total Nitrogen (mg/l) | pH | Alkalinity (mg/l) | Total $CO_2$ (mg/l) | Dissolved Oxygen (mg/l) | BOD (mg/l) |
|---|---|---|---|---|---|---|---|---|---|---|---|---|
| A | Effluent from Fish Tanks[1] | 2.50 | 0.22 | 1.9 | 4.6 | 1.4 | 6.0 | 6.75 | 100 | 113 | 13.1 | 11.9 |
|  | % of initial removed in this stage | Initial | Initial | Initial | Initial | Initial | Initial | Initial | Initial | Initial | Initial | Initial |
| B | Effluent from tilapia Channel | N/A | N/A | N/A | N/A | N/A | N/A | N/A | N/A | N/A | N/A | N/A |
|  | % of initial removed in this stage | N/A | N/A | N/A | N/A | N/A | N/A | N/A | N/A | N/A | N/A | N/A |
| C | Effluent from S.M.A.R.T | 1.05 | 0.28 | 3.4 | 4.7 | 0.9 | 5.7 | 6.85 | 89 | 94 | 7.6 | N/A |
|  | % of initial removed in this stage | 58% | -28% | -84% | -3% | 35% | 6% | N/A | 12% | 17% | 42% | N/A |
| D | Effluent from Constructed Wetlands | 1.09 | 0.16 | 2.5 | 3.7 | 0.5 | 4.2 | 6.95 | 102 | 106 | 4.8 | 4.0 |
|  | % of initial removed in this stage | -2% | 56% | 51% | 22% | 30% | 24% | N/A | -14% | -11% | 21% | N/A |
|  | Total Removed (% of Initial) | 56% | 28% | -32% | 19% | 65% | 30% | N/A | -2% | 6% | 64% | 66% |

Notes:
1. After particulate removal system, which was only monitored for changes in VSS (See Table 1.)

In summary, the novel wastewater treatment system 10 described here is comprised of three subsystems. The first subsystem is the organism-based, typically fish-based particulate removal component 20, the second subsystem is the SMART biofilter reactor 30, and the third subsystem is the constructed wetlands 40. The three subsystems are designed to work together in a sequential step treatment process. Each of the three main components contribute to the reduction in concentration of several important pollutants. The primary pollutants which were addressed in this system are toxic nitrogenous compounds such as ammonia, carbon dioxide which may be toxic as well as contributing to unacceptable pH changes and suspended solid particulates which can degrade into more toxic compounds. The resultant treated wastewater is of sufficiently high quality that when mixed with a small amount of new make-up water from a water source such as a groundwater aquifer well, it may be circulated back into primary fish production tanks 13 for reuse in an aquaculture system. In addition to providing for sequential low technology, cost effective, non-fouling treatment of wastewater, this system turns waste products into a marketable by product in the form of the harvestable detritivorous fish species used for initial particulate removal.

It should be understood, however, that even though these numerous characteristics and advantages of the invention have been set forth in the foregoing description, together with details of the structure and function of the invention, the disclosure is illustrative only, and changes may be made in detail, especially in matters of shape, size, chemistry and arrangement of parts within the principal of the invention to the full extent indicated by the broad general meaning of the terms in which the appended claims are expressed.

What is claimed is:

1. An aquaculture wastewater treatment system comprising:
   (a) a fish species-based particulates removal subsystem further comprising a separate fish raceway for holding a secondary crop fish, and whereby said secondary crop fish actively feed on, and thereby remove, particulates from wastewater prior to further wastewater treatment subsystems;
   (b) a suspended media biofilter reactor ammonia removal subsystem including suspended media means for supporting the growth of microorganisms active in nitrification and denitrification, and thereby ammonia contaminants removal; and
   (c) a constructed wetlands subsystem, whereby the effluent wastewater from said ammonia removal subsystem is further treated for contaminants removal.

2. An aquaculture wastewater treatment system according to claim 1, wherein said fish species-based particulates removal subsystem includes an elongated fish raceway solids removal channel for the production of a secondary fish crop which feeds on the particulates and solids within primary fish crop production effluent, thereby greatly reducing the particulate contamination in said primary fish production effluent.

3. An aquaculture wastewater treatment system according to claim 1, wherein said secondary crop fish includes a detritivorous hardy omnivorous opportunistic fish species.

4. An aquaculture wastewater treatment system according to claim 1, wherein said suspended media biofilter reactor ammonia removal subsystem includes an open ditch bioreactor with effluent circulation means, suspended biomass support means, and aeration means.

5. An aquaculture wastewater treatment system according to claim 4, wherein said effluent circulation means includes a powered paddlewheel assembly.

6. An aquaculture wastewater treatment system according to claim 4, wherein said suspended biomass support means includes a floating polyurethane foam microorganism carrier substrate cut to cubic or spherical shapes of varying sizes.

7. An aquaculture wastewater treatment system according to claim 4, wherein said suspended biomass support means includes extruded plastic pipe in various shapes cut to varying sizes.

8. An aquaculture wastewater treatment system according to claim 4, wherein said aeration means includes an air or oxygen injection system, air supply piping, and aeration heads arranged in an array such that aeration is uniform throughout said open ditch bioreactor.

9. An aquaculture wastewater treatment system according to claim 1, wherein said constructed wetlands subsystem includes a series of interconnected shallow earthen ponds having a locationally-based variably-controllable aeration network.

10. An aquaculture wastewater treatment system according to claim 9, wherein said locationally-based variably-controllable aeration network includes an aeration supply piping network located in recessed portions of the floor of said earthen ponds, having spaced apart aeration heads attached thereto in communication with an air or oxygen injector blower means for the purpose of actively aerating water within said constructed wetlands subsystem.

11. A biofilter reactor subsystem for use in an aquaculture wastewater treatment system comprising:
    (a) an open ditch bioreactor vessel structure in fluid communication with an aquaculture operation effluent source, having an inlet, and an outlet for said effluent;
    (b) effluent circulation means whereby the effluent to be treated within said bioreactor vessel is kept in continuous motion at a flow velocity of about 0.15 to about 2.00 cubic feet per second;
    (c) media means to support the growth and proliferation of microorganisms, said media means suspended within the effluent, said media being moved by the effluent, whereby the media means supports the growth of autotrophic nitrifying bacteria and facilitates the metabolism of ammonia through conversion to nitrate by nitrification oxidation reactions; and
    (d) aeration means to inject air or oxygen into the effluent to be treated within said bioreactor vessel.

12. A biofilter reactor subsystem for use in an aquaculture wastewater treatment system according to claim 11 wherein said suspended media means for supporting the growth of microorganisms active in nitrification and denitrification, and thereby ammonia contaminants removal, includes polyurethane foam, and further wherein said polyurethane foam media is configured into polyurethane foam cubes, spheres or other regular or irregular shapes.

13. A biofilter reactor subsystem for use in an aquaculture wastewater treatment system according to claim 11 wherein said suspended media means for supporting the growth of microorganisms active in nitrification and denitrification, and thereby ammonia contaminants removal, includes extruded plastic pipe cut into varying lengths from about 0.25 to about 8.00 inches in length, and further wherein said cut extruded plastic pipe media is configured into varying shapes for the purpose of increasing surface area, thereby providing increased microorganism growth thereon.

14. A biofilter reactor subsystem for use in an aquaculture wastewater treatment system according to claim 12 wherein said polyurethane foam media is maintained at about 4% to about 60% volume of media to volume of effluent within said bioreactor vessel, and further wherein calculation of the volume of media is determined by the sum of the maximum external dimensional volume of each media element within said bioreactor vessel divided by the full volume of water within said bioreactor vessel.

15. A biofilter reactor subsystem for use in an aquaculture wastewater treatment system according to claim 13 wherein said extruded plastic pipe media is maintained at about 4% to about 60% volume of media to volume of effluent within said bioreactor vessel, and further wherein calculation of the volume of media is determined by the sum of the maximum external dimensional volume of each media element within said bioreactor vessel divided by the full volume of water within said bioreactor vessel.

16. A biofilter reactor subsystem for use in an aquaculture wastewater treatment system according to claim 11 wherein said effluent circulation means includes one or more powered paddlewheels, thereby creating and maintaining effluent flow within said bioreactor vessel at specified rates and enabling moderate aeration of surface effluent.

17. A biofilter reactor subsystem for use in an aquaculture wastewater treatment system according to claim 11 wherein said aeration means includes an air or oxygen injection means, aeration supply piping means, and spaced apart aeration heads.

18. A biofilter reactor subsystem for use in an aquaculture wastewater treatment system according to claim 11 wherein said sediment removal means includes a floor screen located in the floor of said bioreactor vessel enabling sediment to reach a narrow auger pit, including a powered auger, whereby said powered auger turns and facilitates the removal of any sediment in contact with said auger.

19. A method for making an aquaculture wastewater treatment system comprising the steps of:
    (a) providing a fish species-based particulates removal subsystem further comprising a separate fish raceway for holding a secondary crop fish, and whereby said secondary crop fish actively feed on, and thereby remove, particulates from wastewater prior to further wastewater treatment subsystems;
    (b) providing a suspended media biofilter reactor ammonia removal subsystem including suspended media means for supporting the growth of microorganisms active in nitrification and denitrification, and thereby ammonia contaminants removal; and
    (c) providing a constructed wetlands subsystem, whereby the effluent wastewater from said ammonia removal subsystem is further treated for contaminants removal.

20. The method for making an aquaculture wastewater treatment system according to claim 19 wherein said step of providing a fish species-based particulates removal subsystem includes constructing a long narrow fish raceway structure and supplying a population of a detritivorous hardy omnivorous opportunistic fish species therein.

21. The method for making an aquaculture wastewater treatment system according to claim 19 wherein said step of providing a suspended media biofilter reactor ammonia removal subsystem includes providing an open ditch bioreactor vessel structure in fluid communication with an aquaculture operation effluent source, having an inlet, and an outlet for said effluent; effluent circulation means whereby the effluent to be treated within said bioreactor vessel is kept in continuous motion at specified flow velocities; suspended media is kept in constant motion within the effluent to be treated within said bioreactor vessel, by said effluent circulation means, whereby said media is optimally configured for maximum surface area to support the growth and proliferation of microorganisms, supports the growth of autotrophic nitrifying bacteria and facilitates the metabolism of ammonia converting it to nitrate in typical nitrification oxidation reactions; aeration means, whereby the uniform injection of air or oxygen into the effluent to be treated within said bioreactor vessel, is accomplished; and sediment removal means.

22. The method for making an aquaculture wastewater treatment system according to claim 19 wherein said step of providing a constructed wetlands subsystem includes providing shallow earthen ponds with a locationally-based variably-controllable aeration network for the purpose of actively aerating water within said constructed wetlands subsystem, and further comprising cultivated climate tolerant plant species which facilitate denitrification of wastewater effluents.

23. The method for making an aquaculture wastewater treatment system according to claim 22 wherein said cultivated climate tolerant plant species includes bulrush plants of the genus Scirpus.

* * * * *